(12) United States Patent
Zhang

(10) Patent No.: US 9,990,860 B2
(45) Date of Patent: Jun. 5, 2018

(54) WEARABLE BLIND GUIDING APPARATUS

(71) Applicant: BOE Technology Group Co., Ltd., Beijing (CN)

(72) Inventor: Jingyu Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 205 days.

(21) Appl. No.: 14/800,365

(22) Filed: Jul. 15, 2015

(65) Prior Publication Data

US 2016/0284235 A1    Sep. 29, 2016

(30) Foreign Application Priority Data

Mar. 23, 2015    (CN) .......................... 2015 1 0128660

(51) Int. Cl.
*G01C 21/20* (2006.01)
*G09B 21/00* (2006.01)
(Continued)

(52) U.S. Cl.
CPC .......... *G09B 21/003* (2013.01); *A61H 3/061* (2013.01); *G01C 21/20* (2013.01); *G01S 11/12* (2013.01);
(Continued)

(58) Field of Classification Search
CPC .. G09B 21/003; G09B 21/001; G09B 21/006; G09B 21/007; A61H 3/061; A61H 2003/065; A61H 2201/604; A61H 2201/1635; A61H 2201/165; A61H 2201/5007; A61H 2201/5012; A61H 2201/5025; A61H 2201/5043; A61H 2201/5046; A61H 2201/5048; A61H 2201/5061; A61H 2201/5064;
(Continued)

(56) References Cited

U.S. PATENT DOCUMENTS 6,502,032 B1 * 12/2002 Newman .............. G09B 21/003
345/156
6,774,788 B1    8/2004 Balfe
(Continued)

FOREIGN PATENT DOCUMENTS

CN    101076841 A    11/2007
CN    101653392 A    2/2010
(Continued)

OTHER PUBLICATIONS

Mar. 3, 2017—(CN) First Office Action—Application No. 201510128660.2.
(Continued)

*Primary Examiner* — Sam Yao
*Assistant Examiner* — Lily M Del Valle
(74) *Attorney, Agent, or Firm* — Banner & Witcoff, Ltd.

(57) ABSTRACT

A blind guiding apparatus comprises a first wearable assembly on which a voice recognition unit, a central processing unit, a GPS unit, a voice output unit and a Braille display unit are disposed. The blind guiding apparatus provides real-time positioning and navigating functions for a blind user walking outside, wherein the Braille display unit allows the user to confirm a destination address recognized by the voice recognition unit so as to avoid error in navigation.

16 Claims, 3 Drawing Sheets

(51) Int. Cl.

| | |
|---|---|
| *G01S 19/14* | (2010.01) |
| *G01S 19/47* | (2010.01) |
| *G06K 9/00* | (2006.01) |
| *G06K 9/20* | (2006.01) |
| *G06K 9/22* | (2006.01) |
| *G06F 3/01* | (2006.01) |
| *G01S 19/35* | (2010.01) |
| *G01S 11/12* | (2006.01) |
| *A61H 3/06* | (2006.01) |
| *G10L 15/22* | (2006.01) |

(52) U.S. Cl.
CPC .............. *G01S 19/14* (2013.01); *G01S 19/35* (2013.01); *G01S 19/47* (2013.01); *G06F 3/016* (2013.01); *G06K 9/00664* (2013.01); *G06K 9/209* (2013.01); *G06K 9/22* (2013.01); *A61H 2003/065* (2013.01); *A61H 2201/0184* (2013.01); *A61H 2201/1604* (2013.01); *A61H 2201/164* (2013.01); *A61H 2201/165* (2013.01); *A61H 2201/1635* (2013.01); *A61H 2201/5007* (2013.01); *A61H 2201/5012* (2013.01); *A61H 2201/5025* (2013.01); *A61H 2201/5043* (2013.01); *A61H 2201/5046* (2013.01); *A61H 2201/5048* (2013.01); *A61H 2201/5061* (2013.01); *A61H 2201/5064* (2013.01); *A61H 2201/5069* (2013.01); *A61H 2201/5084* (2013.01); *A61H 2201/5092* (2013.01); *A61H 2201/5097* (2013.01); *G10L 2015/221* (2013.01)

(58) Field of Classification Search
CPC .... A61H 2201/5069; A61H 2201/5084; A61H 2201/5092; A61H 2201/5097; G01C 21/20; G01S 11/12; G01S 19/14; G01S 19/47; G06F 3/016; G06F 19/34; G06K 9/2009; G06K 9/22; G10L 2015/221
USPC .......................................... 434/111, 112, 113
See application file for complete search history.

(56) References Cited

U.S. PATENT DOCUMENTS

| | | | | |
|---|---|---|---|---|
| 2005/0099318 | A1* | 5/2005 | Gilfix | G09B 21/001 340/4.14 |
| 2009/0303175 | A1* | 12/2009 | Koivunen | A63F 13/10 345/156 |
| 2012/0062357 | A1* | 3/2012 | Slamka | G01C 21/20 340/4.11 |
| 2012/0319981 | A1* | 12/2012 | Habas | G09B 21/008 345/173 |
| 2014/0184384 | A1* | 7/2014 | Zhu | G09B 21/007 340/4.12 |
| 2015/0339905 | A1* | 11/2015 | Stevens | G08B 21/02 340/4.1 |

FOREIGN PATENT DOCUMENTS

| | | | |
|---|---|---|---|
| CN | 101799299 A | | 8/2010 |
| CN | 201976166 U | | 9/2011 |
| CN | 102429801 A | * | 5/2012 |
| KR | 20130031423 A | | 3/2013 |

OTHER PUBLICATIONS

Jul. 24, 2017—(CN) Second Office Action Appn 201510128660.2 with English Tran.

Mar. 29, 2018—(CN) Fourth Office Action Appn 201510128660.2 with English Tran.

Chen, Ying, "Lighting Up" 'the Blind's Reading by Mobile Reading Platforms', Cooperation Innovation and Development of Library, Jinan University Press, pp. 193-196, Sep. 2010, <http://www.zirankxzl.cn/n/print.jsp>.

Xiao Han, "GPS Speech Recognition in Vehicle Navigation System", Chinese Doctoral Dissertations & Master's Thesis, Information and Science Technology, vol. 9, pp. 1-2, Sep. 2006, <http://www.cmfd.cnki.net/Journal/Issue.aspx?dbCode=CMFD&PYKM=111M&YEAR=2006&Issue=09&Volume=01&Page=14>.

Raunek Kantharia, "Touch & Go" The New Age Navigation Concept for the Visually Impaired, WALYOU, pp. 1-6, May 2010, <http://walyou.com/blog/2010/05/13/touch-go-navigation-concept-visually-impaired/>.

Japanese Experience of Serving Persons with Dyslexia by DAISY, ? 1994-2015 China Academic Journal Electronic Publishing House, Jun. 2008, <http://www.cnki.net>.

* cited by examiner

WEARABLE BLIND GUIDING APPARATUS

This application claims priority to Chinese Patent Application No. 201510128660.2 filed on Mar. 23, 2015. The present application claims priority to and the benefit of the above-identified application and is incorporated herein in its entirety.

TECHNICAL FILED

Embodiments of the present invention relate to a wearable blind guiding apparatus.

BACKGROUND

Blind people may experience lots of inconveniences in daily life due to their natural dysopia, especially those hidden dangers resulted by obstacles and travelling vehicles on the roads when they are walking outside, which leads to difficulties in their daily activities outdoor.

At present, blind people mostly utilize walking sticks for detecting a condition of road ahead. Of course, there are also few blind people going out with the company of seeing-eye dogs. However, as noted by the Applicant, these well-known blind guiding means involve several problems at least including that the walking stick is restricted in its function and unable to be well adapted to the road conditions nowadays which are usually very complicated, and that the seeing-eye dog may get scared and hence cause security threats to the walkers around.

SUMMARY

At least one embodiment of the present invention provides a wearable blind guiding apparatus which allows a correct input of walking path for blind people.

The blind guiding apparatus as provided by embodiments of the present invention comprises a first wearable assembly, on which a voice recognition unit, a central processing unit, a GPS unit, a voice output unit and a Braille display unit are disposed; wherein the voice recognition unit is connecting to the Braille display unit and is configured to receive voice information of a user, recognize a destination address from the voice information and send the destination address to the Braille display unit; the Braille display unit is further connecting to the central processing unit, and is configured to generate Braille information based on the destination address and transmit the destination address to the central processing unit upon it's confirmed to be matched with the voice information by the user; the central processing unit is further connecting to the GPS unit, stored with an electronic map database, and configured to search for a walking route within the electronic map database according to the destination address and transmit the walking route to the GPS unit; the GPS unit is configured to perform a real-time positioning based on the walking route and send position information generated from the positioning back to the central processing unit; the voice output unit is connecting to the central processing unit, and is configured to output navigating information generated by the central processing unit based on the position information, in a form of voice.

BRIEF DESCRIPTION OF THE DRAWINGS

Embodiments of the present invention will be described in more detail below with reference to the accompanying drawings to enable those skilled in the art to understand the present invention more clearly, wherein.

REFERENCE NUMERAL

1—first wearable assembly

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Figure 1:
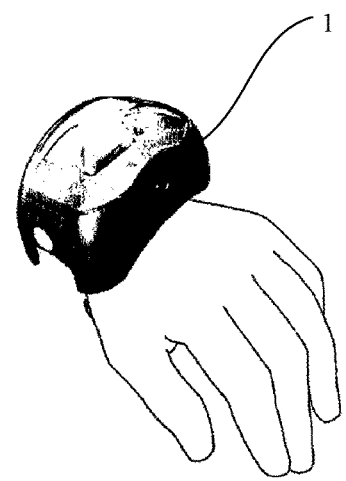
FIG. 1 is a schematic diagram illustrating a first wearable assembly of a wearable blind guiding apparatus according a first embodiment of the present invention.
Figure 2:
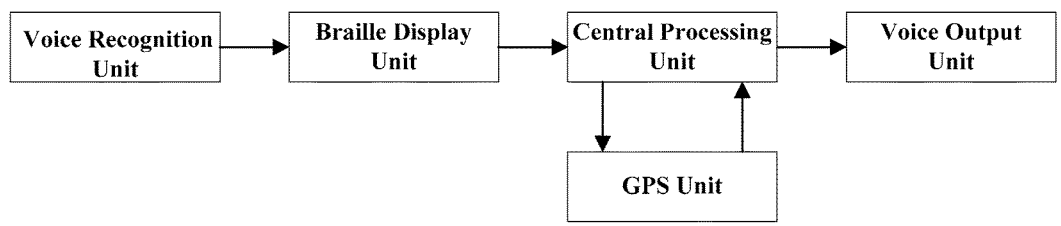
FIG. 2 is a schematic diagram illustrating a structure of the first wearable assembly of the wearable blind guiding apparatus according the first embodiment of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly. The applicant realized that a light transmittance of LC panel in the array substrate shown in FIG. 1 and FIG. 2 is not quite large due to the same voltage of common electrodes in the array substrate.

Embodiments of the present invention provide a blind guiding apparatus, comprising: a first wearable assembly on which a voice recognition unit, a central processing unit, a GPS unit, a voice output unit and a Braille display unit are disposed; wherein the voice recognition unit is connecting to the Braille display unit, and is configured to receive voice information of a user (including both amblyopic people and blind people), recognize a destination address from the voice information and send the destination address to the Braille display unit; the Braille display unit is further connecting to the central processing unit, and is configured to generate Braille information based on the destination address and transmit the destination address to the central processing unit upon it's confirmed to be matched with the voice information by the user; the central processing unit is further connecting to the GPS unit, stored with an electronic map database, and is configured to search for a walking route within the electronic map database according to the destination address and transmit the walking route to the GPS unit; the GPS unit is configured to perform a real-time positioning based on the walking route and send position information, generated from the real-time positioning back to the central processing unit; the voice output unit is connecting to the central processing unit, and is configured to output navigating information generated by the central processing unit based on the position information in a form of voice.

According to embodiments of the present invention, the above-mentioned first wearable assembly can be any wearable accessory such as a bracelet, an anklet, a hair band and a hat which does not only play a role of decoration but also provide additional functions like real-time positioning and navigating based on a walking route for a blind user who is walking outside. The first wearable assembly is provided with a Braille display unit, through which the user can confirm the destination address as recognized from the voice information as input, so as to ensure an accuracy of the walking route as searched, when the ambient noise has a negative influence on an accuracy of recognizing the voice information, thereby ensuring the convenience and security of a blind user who is walking outside.

Hereinafter embodiments of the above-mentioned wearable blind guiding apparatus are described in details with reference to the drawings.

The First Embodiment

As illustrated in FIG. 1, the present embodiment provides a wearable blind guiding apparatus comprising at least a first wearable assembly 1; the first wearable assembly 1 can be, for example, a bracelet which can be worn on a wrist of the user, so as to provide both of aesthetics and navigation.

Figure 3:
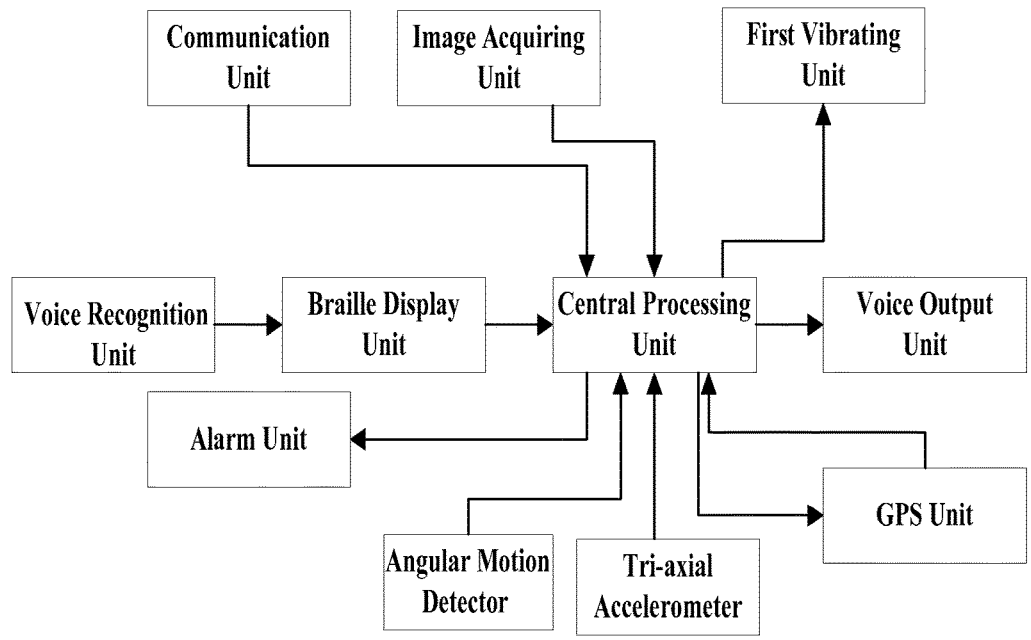
FIG. 3 is a schematic diagram illustrating another structure of the first wearable assembly of the wearable blind guiding apparatus according the first embodiment of the present invention.

In an example, as illustrated in FIG. 2 and FIG. 3, the bracelet is provided with a voice recognition unit, a central processing unit, a GPS unit, a voice output unit and a Braille display unit. For example, the user (including both amblyopic people and blind people) inputs voice information containing a destination address to be arrived by, for example, speaking out the destination address. At this time, it's possible that the information received by the recognition unit is mixed with ambient noise around the user, thus in some cases it's required to recognize the voice information of the user by for example filtering, firstly, then recognize a destination address to be confirmed from the voice information, and finally send the destination address to be confirmed to the Braille display unit; the Braille display unit generates Braille information based on the destination address to be confirmed; the user touches the Braille information with fingers to determine whether the destination address to be confirmed is matched with the destination address to be arrived in the voice information as input, if so, the destination address as received by the Braille display unit is transmitted to the central processing unit; the central processing unit searches for a walking route leading to the destination address as received within an electronic map database restored therein and sends the walking route to the GPS (Global Position System) unit; the GPS unit performs a real-time positioning based on the walking route and sends position information generated from the real-time positioning back to the central processing unit; at this time, the central processing unit generates navigating information according to the position information and sends the navigating information to the voice output unit; and then the voice output unit converts and outputs the navigating information in a form of voice.

In an example, the voice recognize unit comprise a voice receiver, a filter and a chip including programs capable of performing corresponding functions as described, which are all well-known technologies and thus will not be repeated herein.

In an example, the bracelet is further provided with an image acquiring unit and a first vibrating unit which are both connecting to the central processing unit; the image acquiring unit is configured to acquire an image of the road ahead and send the image to the central processing unit, in real time; the central processing unit is further configured to send a second controlling signal to the first vibrating unit upon recognizing an obstacle in the image; and the first vibrating unit is configured to generate a first vibrating signal in response to the second controlling signal, so as to draw the user's attention to the obstacle existed on the road.

According to the present embodiment, an image acquiring unit is disposed in the bracelet so that a condition of the road ahead is obtained in real time, which allows warning the user about an obstacle on the road through the first vibrating unit upon recognizing the obstacle in the image, so as to ensure the security of blind people during outside walking.

In an example, the above-mentioned central processing unit is further configured to send a third controlling signal to the first vibrating unit when the position information generated from the real-time positioning of the GPS unit is indicating a corner; at this time, the first vibrating unit is further configured to send a second vibrating signal in response to the third controlling signal to draw the user's attention to the turning direction. For example, it can be configured to indicate left turning by vibrating for one time and to indicate right turning by vibrating for two times. Of course, it can inform the user of the turning direction by other well-known forms of vibration, which will not be described herein in details. Obviously, the time or manner of vibration for informing the user of the turning direction shall be configured to be distinguished from that for informing the user of the condition (the existence of the obstacle) of road ahead.

In an example, the above-mentioned image acquiring unit can be an infrared sensor or other devices with image capturing function such as a camera.

In an example, the above-mentioned first vibrating unit is a vibrating motor.

In an example, the bracelet in the present embodiment further comprises a tri-axial accelerometer, an angular motion detector and an alarm unit which are all connecting to the central processing unit; the tri-axial accelerometer is configured to measure tri-axial acceleration of the user in real time; the angular motion detector can be, for example, a gyroscope, and is configured to measure an angular velocity of the user in real time; the above-mentioned tri-axial acceleration and angular velocity are sent to the central processing unit for further computing a resultant acceleration and a deflection angle of the user over a predetermined period, so as to determine whether there is a falling event by determining whether the resultant acceleration and the deflection angle both exceed respective threshold values; if so, the central processing unit sends a first controlling signal to the alarm unit; the alarm unit is configured to generate alarm signal in response to the first controlling signal and send the same to a communication terminal, so as to ensure that somebody will get the news upon any accident happened to the user; in this way, a real-time monitoring on the safety of the blind people walking outside can be achieved, which allows safe travelling. For example, the communication terminal is generally a cell phone.

The above-mentioned tri-axial accelerometer and angular motion detector (e.g., gyroscope) are both well-known in the art and will not be described in details herein.

The above-mentioned methods of computing the resultant acceleration and the deflection angle as well as the setting of related threshold values are all well-known in the related art, and will not be described in details herein.

It should be explained that in some examples the alarm unit generates the alarm signal in a form of communication signal which is directly sent to the communication terminal, and in some other examples the alarm unit generates the alarm signal in a form of instruction which is indirectly sent to the communication terminal through a communication unit pre-disposed in the bracelet.

In the present embodiment, a mechanic-electronic Braille display or an electronic-film Braille display can be utilized as the Braille display unit.

In an example, the mechanic-electronic Braille display comprises several direction keys, a confirm key and a Braille display unit which is built up by several dot cells each containing 8 convex dots arranged in an array. These convex dots are usually actuated by piezoelectric effect through piezoelectric elements. The piezoelectric element is increased in volume when applied with a voltage and lifts the convex dot by means of lever principle, so as to achieve relief effect. The direction keys, when pressed, are configured to achieve up-down page rolling and left-right page turning; and the confirm key, when pressed, is configured to finally confirm the Braille information. The destination address recognized by the voice recognition unit is presented by the Braille display unit word by word, touched by the user who presses the confirmation key for confirmation, and finally transmitted to the central processing unit upon completely confirmed by the user.

In an example, the electronic-film Braille display utilizes an electronic touching screen with tactile feedback to present depression and projection so as to form Braille. The electronic-film Braille display comprises a LC flat panel, a plurality of force sensors and a back-and-forth movable mechanical arm. The electronic touching screen utilizes tactile feedback technology and provides feedback to the user through resistance force and vibration to allow the user being aware of the text (including the destination address to be confirmed as well as options for up-down page rolling and left-right page turning) presented by the screen through feeling the depression and projection on the screen.

The first wearable assembly 1 in the wearable blind guiding apparatus as provided by the present embodiment is described with a bracelet by way of example. However, it should be understood that the above description in terms of structure and/or principle is identically applicable for wearable blind guiding apparatus with the first wearable assembly 1 in other forms such as anklet, hair hand and hat.

The Second Embodiment

Figure 4:
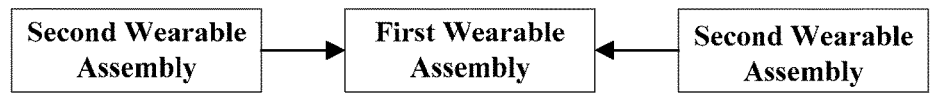
FIG. 4 is a schematic diagram illustrating a wearable blind guiding apparatus comprising two second wearable assemblies according a second embodiment of the present invention.

The wearable blind guiding apparatus as provided by the present embodiment comprises not only the first wearable assembly 1 described in the first embodiment but also two second wearable assemblies which are in communication with the first wearable assembly, as illustrated in FIG. 4. In other words, each of the first wearable assembly and second wearable assembly is provided with a communication unit to ensure a communication between the first wearable assembly and the second wearable assembly.

In an example, the two second wearable assemblies are adapted to be worn at different sides of a human body.

In an example, the second wearable assembly is an anklet

Figure 5:
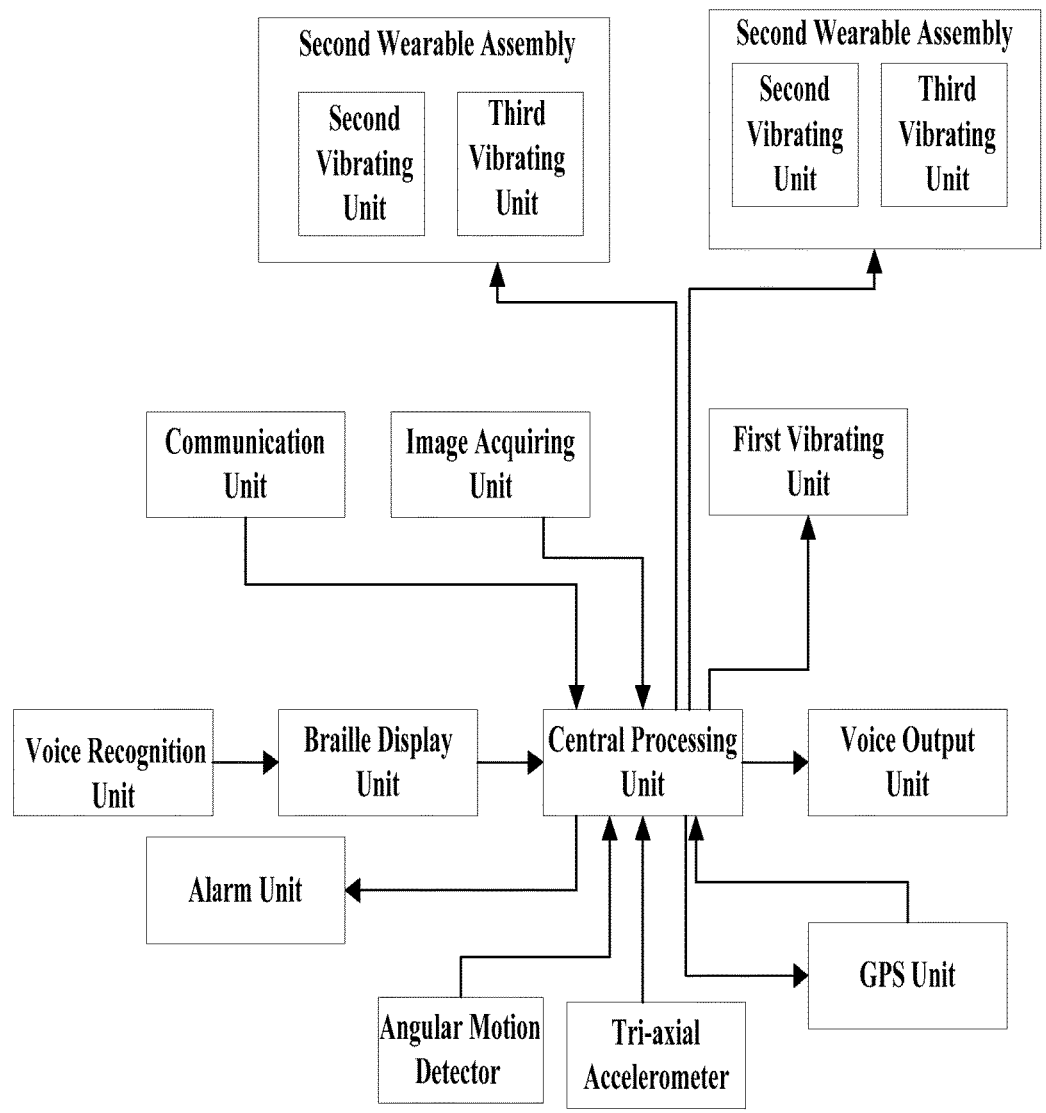
FIG. 5 is a schematic diagram illustrating a structure of the wearable blind guiding apparatus according to the second embodiment of the present invention.

In an example, as shown in FIG. 5, the two second wearable assemblies are provided with a second vibrating unit and a third vibrating unit, respectively, which are connecting to the central processing unit; in this case, if the position information generated from the positioning of the GPS unit is indicating a corner, the central processing unit is further configured to send a fourth controlling signal or a fifth controlling signal to the second vibrating unit or the third vibrating unit; and the second vibrating unit and the third vibrating unit are configured to generate a third vibrating signal or a fourth vibrating signal in response to the fourth controlling signal or the fifth controlling, so as to draw the user's attention to the turning direction; wherein the third vibrating signal and the fourth vibrating signal are representing different turning directions.

In an example, the above-mentioned second vibrating unit and third vibrating unit are vibrating motor.

In the example where the second wearable assembly is an anklet, it can be worn at the left leg and the right leg so that the third or fourth vibrating signal can be transmitted to the left leg or right leg of the user through the second or third vibrating unit to inform the user of the turning direction, even if the ambient noise results in misunderstanding of the navigating information (i.e., obtaining incorrect navigating information) which leads to losing the way.

The second wearable assembly in the wearable blind guiding apparatus as provided by the present embodiment is described with an anklet by way of example. However, it should be understood that the above description in terms of structure and/or principle is identically applicable for wearable blind guiding apparatus with the second wearable assembly in other forms such as bracelet. For example, the second wearable assemblies can be two bracelets which are worn at left hand and right hand of a user, respectively; that is, the user receives the third or fourth vibrating signal through the left hand or right hand so as to be informed of the turning direction.

Those skilled in the art should understand that the connecting manner of the components in the wearable blind guiding apparatus as provided by embodiments of the present invention can be implemented by any wired or wireless (e.g., WIFI and Bluetooth) means well-known in the art and will not be described in details herein.

Those skilled in the art should understand that the central processing unit as described herein can be implemented with software incorporated into necessary general-purpose hardware, or implemented with dedicated hardware, of course, although in most cases the former form is selected as the preferred one. Based on the concept above, the central processing unit in the wearable blind guiding apparatus as provided by embodiments of the present invention is implemented, substantively, with software, hardware, firmware or any combination thereof. Computer software products can be stored in, for example, readable storage mediums such as magnetic storage medium (e.g., hard disk) or electronic storage medium (e.g., ROM and flash disk) carrying with several instructions which, when executed, allow a computing device (a computer, a server or a network device) to achieve functions of the central processing unit in the wearable blind guiding apparatus as provided by embodiments of the present invention.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present application claims the priority of China patent application No. 201510128660.2 filed on Mar. 23, 2015, which is incorporated herein by reference in its entirely.

What is claimed is:

1. A blind guiding apparatus, comprising a first wearable assembly on which a voice recognition unit, a central processing unit, a GPS unit, a voice output unit and a Braille display unit are disposed; wherein
   the voice recognition unit is communicated with the Braille display unit, and is configured to receive voice information of a user and recognize a destination address from the voice information;
   the Braille display unit is further communicated with the central processing unit, and is configured to generate Braille information based on the voice information for the user's confirmation and transmit the destination address to the central processing unit upon it's confirmed to be matched with the voice information by the user;
   the central processing unit is further communicated with the GPS unit, stored with an electronic map database, and configured to search for a walking route within the electronic map database according to the destination address and transmit the walking route to the GPS unit;
   the GPS unit is configured to perform a real-time positioning based on the walking route and send position information generated from the positioning back to the central processing unit;
   the voice output unit is communicated with the central processing unit, and is configured to output navigating information generated by the central processing unit based on the position information in a form of voice;
   the blind guiding apparatus further comprises a tri-axial accelerometer, an angular motion detector and an alarm unit, which are all communicated with the central processing unit;
   the tri-axial accelerometer is configured to measure tri-axial acceleration of the user in real time and send the same to the central processing unit;
   the angular motion detector is configured to measure an angular velocity in real time and send the same to the central processing unit;
   the central processing unit is further configured to send a first controlling signal to the alarm unit upon determining a fall event of the user by computing a resultant acceleration and a deflection angle over a predetermined period based on the tri-axial acceleration and the angular velocity; and
   the alarm unit is configured to generate alarm signal in response to the first controlling signal.

2. The blind guiding apparatus of claim 1, wherein the first wearable assembly further comprises an image acquiring unit and a first vibrating unit which are both communicated with the central processing unit; wherein
   the image acquiring unit is configured to acquire an image of road ahead, and transmit the image to the central processing unit;
   the central processing unit is further configured to send a second first controlling signal to the first vibrating unit upon recognizing an obstacle in the image; and
   the first vibrating unit is configured to generate a first vibrating signal in response to the second controlling signal.

3. The blind guiding apparatus of claim 2, wherein if the position information is indicating a corner, then
   the central processing unit is further configured to send a third controlling signal to the first vibrating unit; and
   the first vibrating unit is further configured to generate a second vibrating signal in response to the third controlling signal.

4. The blind guiding apparatus of claim 2, wherein the image acquiring unit is an infrared sensor.

5. The blind guiding apparatus of claim 3, wherein the image acquiring unit is an infrared sensor.

6. The blind guiding apparatus of claim 2, wherein the first vibrating unit is a vibrating motor.

7. The blind guiding apparatus of claim 3, wherein the first vibrating unit is a vibrating motor.

8. The blind guiding apparatus of claim 1, further comprising two second wearable assemblies which are both in communication with the first wearable assembly.

9. The blind guiding apparatus of claim 8, wherein the two second wearable assemblies comprise a second vibrating unit and a third vibrating unit, respectively, which are both communicated with the central processing unit; and if the position information is indicating a corner, then
   the central processing unit is further configured to send a fourth controlling signal or a fifth controlling signal to the second vibrating unit or the third vibrating unit; and
   the second vibrating unit and the third vibrating unit are configured to send a third vibrating signal and a fourth vibrating signal in response to the fourth controlling signal and the fifth controlling signal, respectively,
   wherein the third vibrating signal and the fourth vibrating signal are representing different turning directions related to the corner.

10. The blind guiding apparatus of claim 8, wherein the two second wearable assemblies are adapted to be worn at different sides of a human body.

11. The blind guiding apparatus of claim 9, wherein the two second wearable assemblies are adapted to be worn at different sides of a human body.

12. The blind guiding apparatus of claim 9, wherein the second vibrating unit and the third vibrating unit are vibrating motor.

13. The blind guiding apparatus of claim 1, wherein the first wearable assembly is any one of a bracelet, an anklet, a hair band and a hat.

14. The blind guiding apparatus of claim 10, wherein the second wearable assembly is a bracelet or an anklet.

15. The blind guiding apparatus of claim 11, wherein the second wearable assembly is a bracelet or an anklet.

16. The blind guiding apparatus of claim 1, wherein the Braille display unit is an electro-mechanical Braille display or an electro-film Braille display.

* * * * *